US005660509A

United States Patent [19]

Cole et al.

[11] Patent Number: 5,660,509
[45] Date of Patent: Aug. 26, 1997

[54] KEY DUPLICATING MACHINE WITH BOTTOM CLEARANCE

[75] Inventors: Stephan W. Cole, Moreland Hills; Ronald B. Berringer, Akron; Hugh F. Groth, Richfield; Eric R. Hammonds, Mantua; Michael G. Koubek, Stow; Anthony Nicholas; Richard Ryai, both of Cleveland; David J. Sot, Strongsville; Paul J. Takacs, Hudson; Samuel J. Zelenak, Strongsville, all of Ohio

[73] Assignee: American Consumer Products, Inc., Solon, Ohio

[21] Appl. No.: 415,490

[22] Filed: Apr. 3, 1995

Related U.S. Application Data

[63] Continuation-in-part of Ser. No. 289,860, Aug. 12, 1994, Pat. No. 5,538,374.

[51] Int. Cl.[6] ....................................................... B23C 3/35
[52] U.S. Cl. ............................................... 409/81; 409/137
[58] Field of Search ................................. 409/81, 83, 137

[56] References Cited

U.S. PATENT DOCUMENTS

| 3,424,056 | 1/1969 | Stolove et al. | 409/83 |
|---|---|---|---|
| 3,442,174 | 5/1969 | Weiner et al. | 409/83 |
| 3,602,092 | 8/1971 | Richens | 90/13.05 |
| 3,796,130 | 3/1974 | Gartner | 409/83 |
| 4,023,464 | 5/1977 | Zion | 90/13.05 |
| 4,283,859 | 8/1981 | Roland | 33/174 F |
| 4,354,780 | 10/1982 | Bougiouris | 409/122 |
| 4,359,299 | 11/1982 | Sagarian | 407/55 |
| 4,432,142 | 2/1984 | Korsak | 33/174 F |
| 4,433,487 | 2/1984 | Roland | 33/174 F |
| 4,601,185 | 7/1986 | Sheldon | 70/456 R |
| 4,848,116 | 7/1989 | Lizotte | 70/306 |
| 5,167,171 | 12/1992 | Heredia | 76/110 |
| 5,259,708 | 11/1993 | Brice | 409/81 |
| 5,271,698 | 12/1993 | Heredia et al. | 409/82 |
| 5,311,756 | 5/1994 | Villani | 70/247 |
| 5,363,463 | 11/1994 | Kleinerman | 385/123 |
| 5,496,138 | 3/1996 | Drori | 409/81 |
| 5,538,374 | 7/1996 | Cole et al. | 409/83 |

*Primary Examiner*—Daniel W. Howell
*Attorney, Agent, or Firm*—Thompson Hine & Flory LLP

[57] ABSTRACT

A key duplicating machine having a key clamping assembly for supporting a key blank and a customer key to be duplicated, a key cutter assembly having a cutter wheel for cutting a pattern on the supported key blank and a follower for tracing a tooth patter on the supported customer key, a housing having a front wall, a top wall and a chip collection drawer lcoated below the front and top walls, the key clamping assembly being mounted on the front wall and the key cutter assembly being mounted on the top wall such that no obstructions exist between the key cutter assembly and the chip collection drawer located below the top wall, so that chips formed from a key cutting operation by the key cutter assembly fall unimpeded to the chip collection drawer, and surfaces which may collect the chips are minimized. In a preferred embodiment, a motor driven cam assembly actuates the key cutter assembly and a finger for locating the key blank and customer key of the key clamping assembly, the cam assembly being mounted on a rear portion of a top wall behind a midwall, and the midwall acts as a barrier to prevent chips produced during a cutting operation from progressing to the cam assembly. The key clamping assembly and key cutter assembly each include modules which accommodate keys for both single and simultaneous double key cutting.

41 Claims, 14 Drawing Sheets

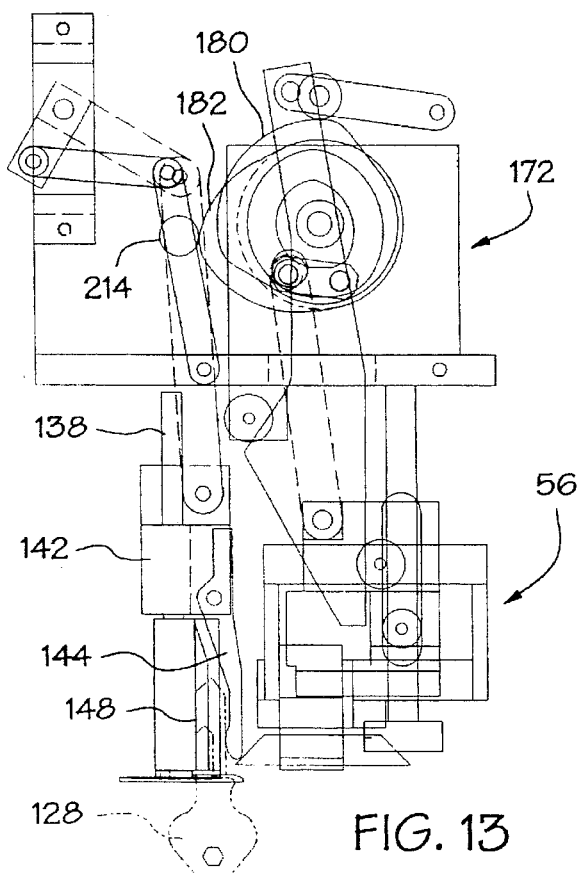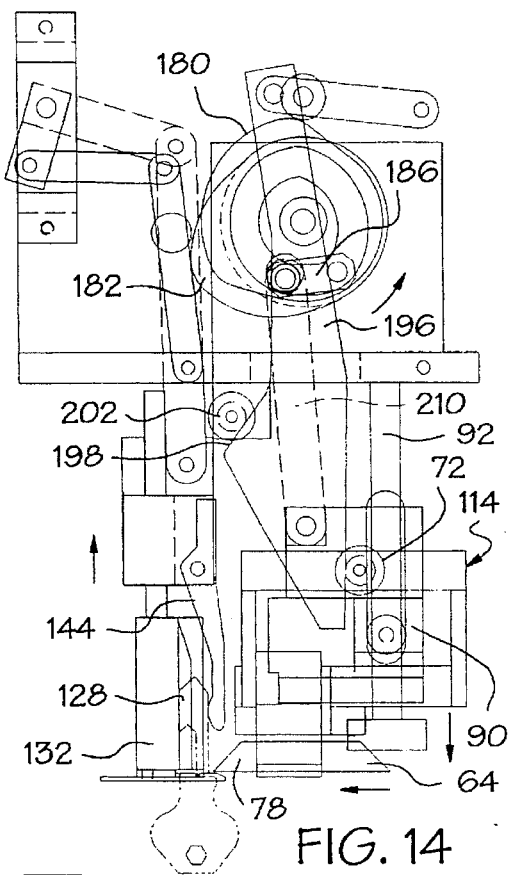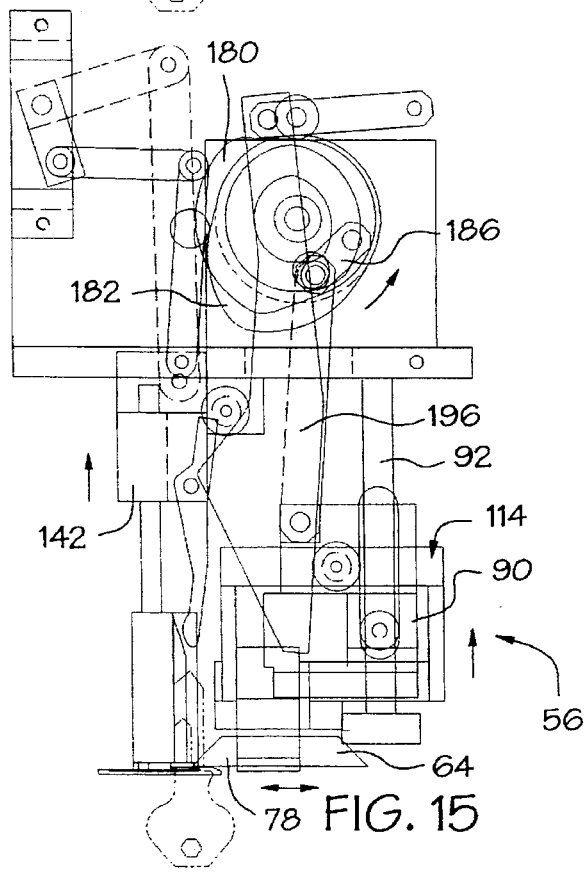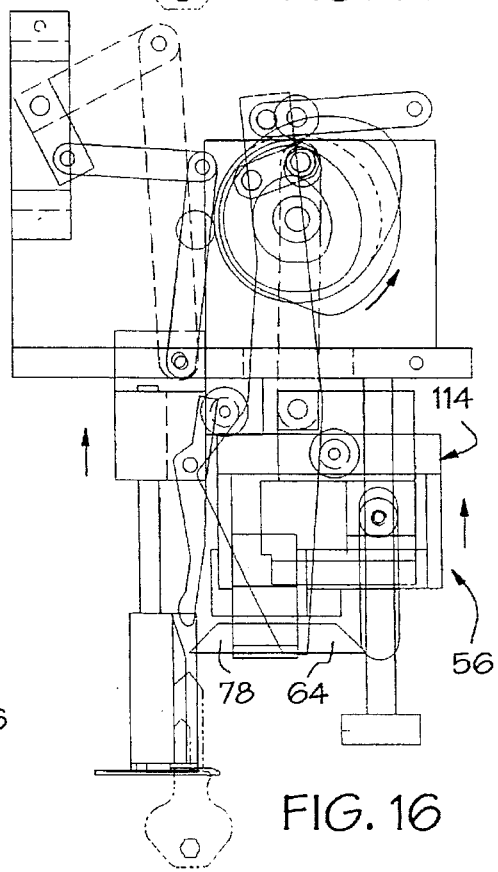

KEY DUPLICATING MACHINE WITH BOTTOM CLEARANCE

CROSS REFERENCE TO RELATED APPLICATION

The present application is a continuation-in-part of U.S. Ser. No. 08/289,860; filed Aug. 12, 1994, now U.S. Pat. No. 5,538,374.

BACKGROUND

The present invention relates to motorized key cutting machines and, more particularly, to fully automated, motorized key duplicating machines.

Fully automated key duplicating machines are designed to be used by an operator who does not possess a high level of skill or who has undergone a great deal of training in order to produce a high quality duplicate key. Such automated key duplicating machines typically include a clamping mechanism which holds the key blank to be cut and the customer key to be duplicated in a parallel relationship to each other, and an automated, motorized cutting assembly. Such a cutting assembly typically includes a cutter motor and a follower, the latter of which traces the notch pattern on the customer key blade, while the cutter wheel driven by the cutter motor cuts a duplicate notch pattern on the blade of the key blank.

The cutter motor and follower are typically mounted on a carriage which is sidewardly displaceable relative to the key clamp component, and that carriage is displaced by means such as a screw drive to move the cutter wheel and follower along a first or cutting pass, then a second or return pass. Typically, such screw drives are mounted on a base plate which is integral with the housing which covers the device. The base plate typically is positioned above a chip collection drawer, which requires that the base plate include cut outs to allow chips formed during the cutting operation to fall to the chip drawer to be collected for subsequent removal. A disadvantage of such systems is that the motor which powers the screw drive, as well as other support structures, are positioned below the cutter wheel and consequently collect chips formed during the cutting operation. Accordingly, there is a need to provide an automated key duplicating machine in which a minimal number of components are located below the cutter wheel so that the surfaces and components positioned to collect chips are minimized, thereby allowing a maximum amount of the chips generated during cutting to fall unimpeded to the chip collection drawer.

SUMMARY OF THE INVENTION

The present invention is a key duplicating machine which is fully automated and includes a key clamping assembly and a key cutter assembly which are totally enclosed within a housing to minimize chip spray. A further advantage of the invention is that the key clamping assembly is mounted on a front wall of the housing and the key cutter assembly is mounted on a top wall of the housing. Consequently, there are no components mounted beneath the cutter assembly to collect chips generated during the key cutting operation. As a result, a maximum amount of chips which are generated during the cutting operation fall unimpeded to a chip collection drawer located at the bottom of the housing. As a result of the design of the present invention, cleaning of the apparatus is required on a less frequent basis than with prior art devices, and clogging and fouling of the components which drive the key cutter assembly are minimized.

In a preferred embodiment of the invention, the top wall is segmented. A front portion of the top wall supports the key cutter assembly and is attached to the front wall to provide a precise location of the key clamping assembly with respect to the key cutter assembly. A midwall is located midway back from the front wall and extends downwardly from the front portion of the top wall. A rear portion of the top wall extends rearwardly from the midwall and supports a motor and cam assembly which is connected by link arms to the clamping assembly and cutter assembly. Consequently, the motor and cam elements of the cam assembly are separated from the region from the key duplicating machine of the invention by the midwall and rear portion. This orientation of components further prevents the accumulation of chips on the components which actuate the cutter assembly and clamping assembly components.

Also in the preferred embodiment, the key duplicating machine is capable of performing either single-sided key duplicating or simultaneous double-sided key duplicating. With this embodiment, the key clamping assembly includes two key clamping modules, one which accommodates a single-sided key and the other accommodating a double-sided key. The key cutter assembly includes two key cutter modules, a first module associated with the first cutter module to perform single-sided key duplicating, and a second module which is associated with the double-sided key clamping module. The key cutter module used for double-sided cutting includes two key cutting units which are positioned on opposite sides of the double-sided key clamping module and reciprocate simultaneously so that a double-sided key can have both blade sides cut at the same time, thereby minimizing the amount of the time required for the double-sided key duplication.

Accordingly, it is an object of the present invention to provide a key duplicating machine with maximum bottom clearance so that chips generated during a key duplicating process fall unimpeded to a chip collection drawer; a key duplicating machine in which the components which effect reciprocation of the key motor and cutter assemblies are shielded from the cutting area to minimize accumulation of chips; a key duplicating machine which is relatively easy to operate and does not require a high level of skill; a key duplicating machine which does not require cleaning as frequently as prior art machines; and a key duplicating machine which is accurate and reliable. Other objects and advantages of the present invention will be apparent from the following description, the accompanying drawings and the appended claims.

BRIEF DESCRIPTION OF THE DRAWINGS

FIGS. 13–20 are schematic top plan views of the single-sided key duplicating module of the invention of FIG. 1, showing movement of the components through a full cutting cycle.

DETAILED DESCRIPTION

Housing

Figure 1:
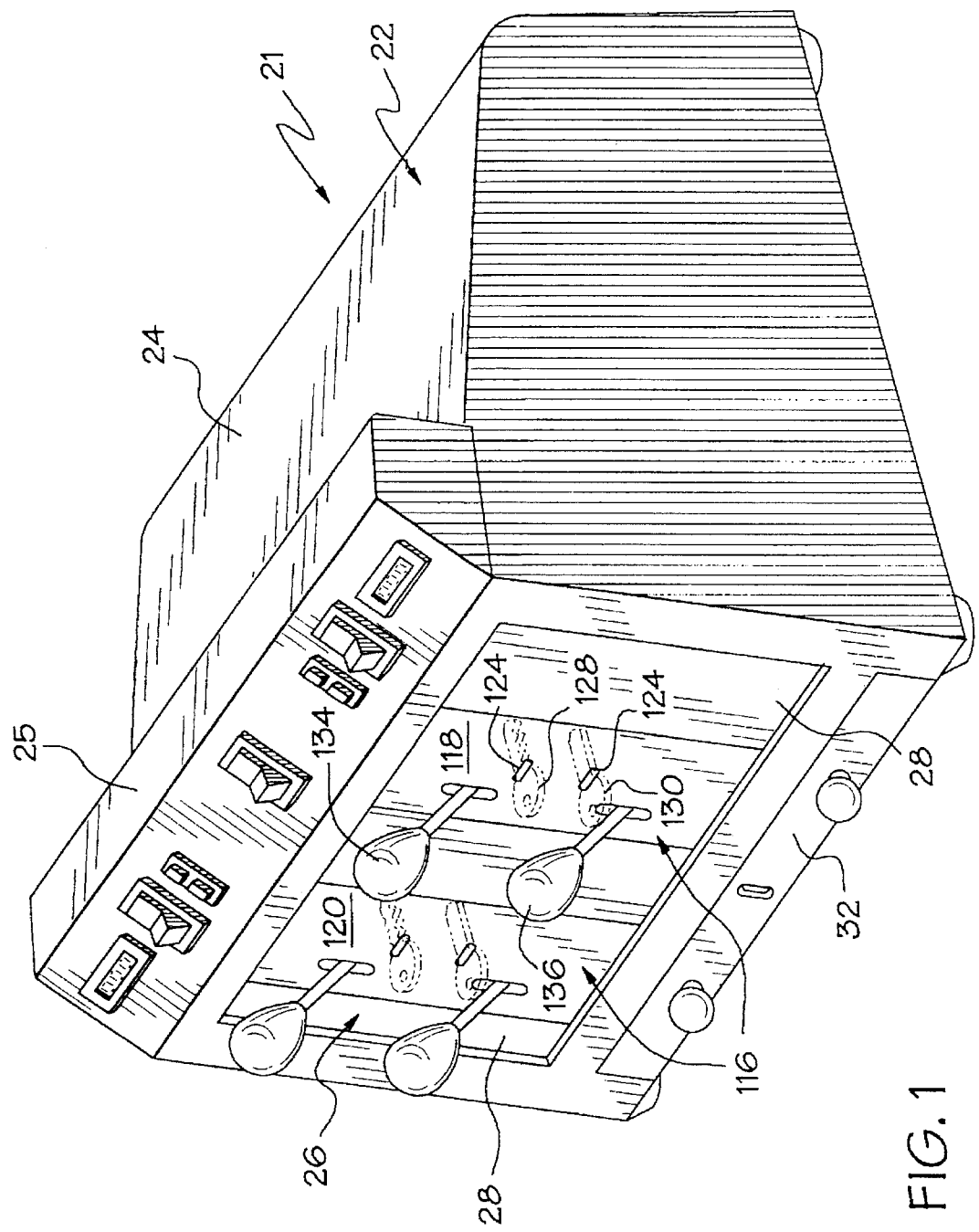
FIG. 1 is a perspective view of the key duplicating machine of the present invention.
Figure 2:
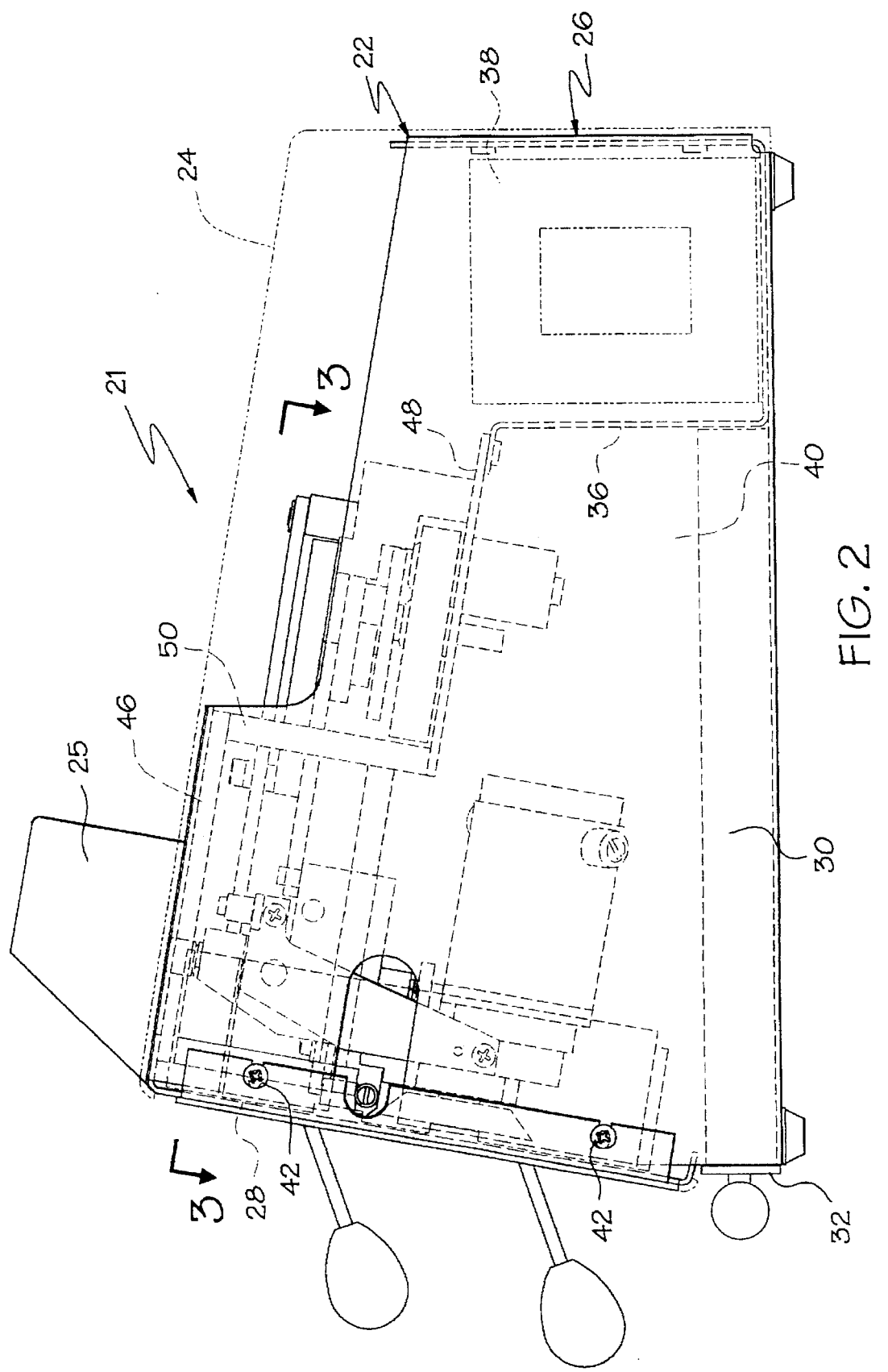
FIG. 2 is a side elevation of the machine of FIG. 1, with the outer housing cover removed.

As shown in FIGS. 1 and 2, the key duplicating machine of the present invention, generally designated 21, is enclosed within a housing 22 which includes a shell 24 that covers the sides of the machine, as well as a portion of the front.

Figure 3:
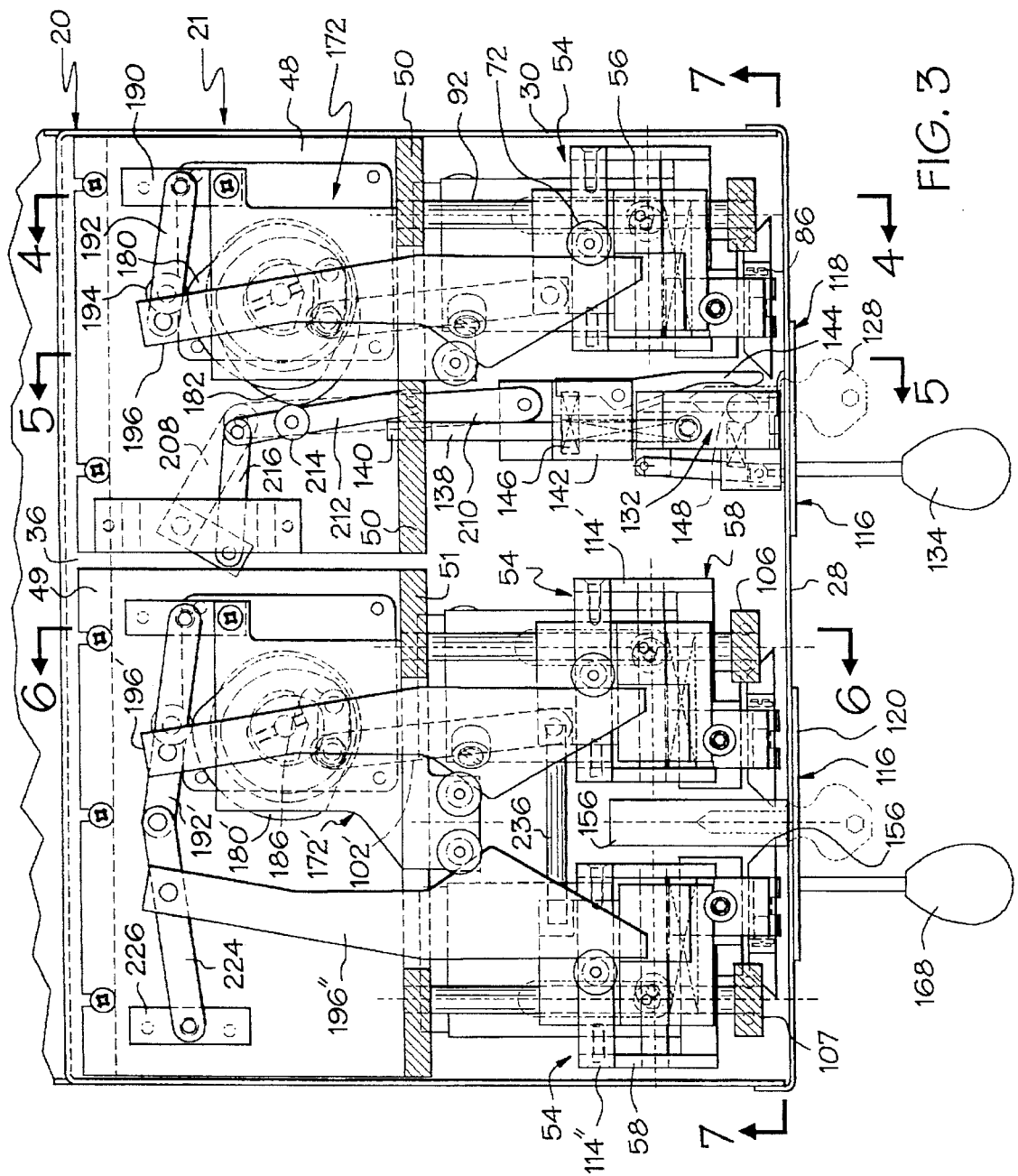
FIG. 3 is a cross section taken at line 3—3 of FIG. 2.
Figure 8:
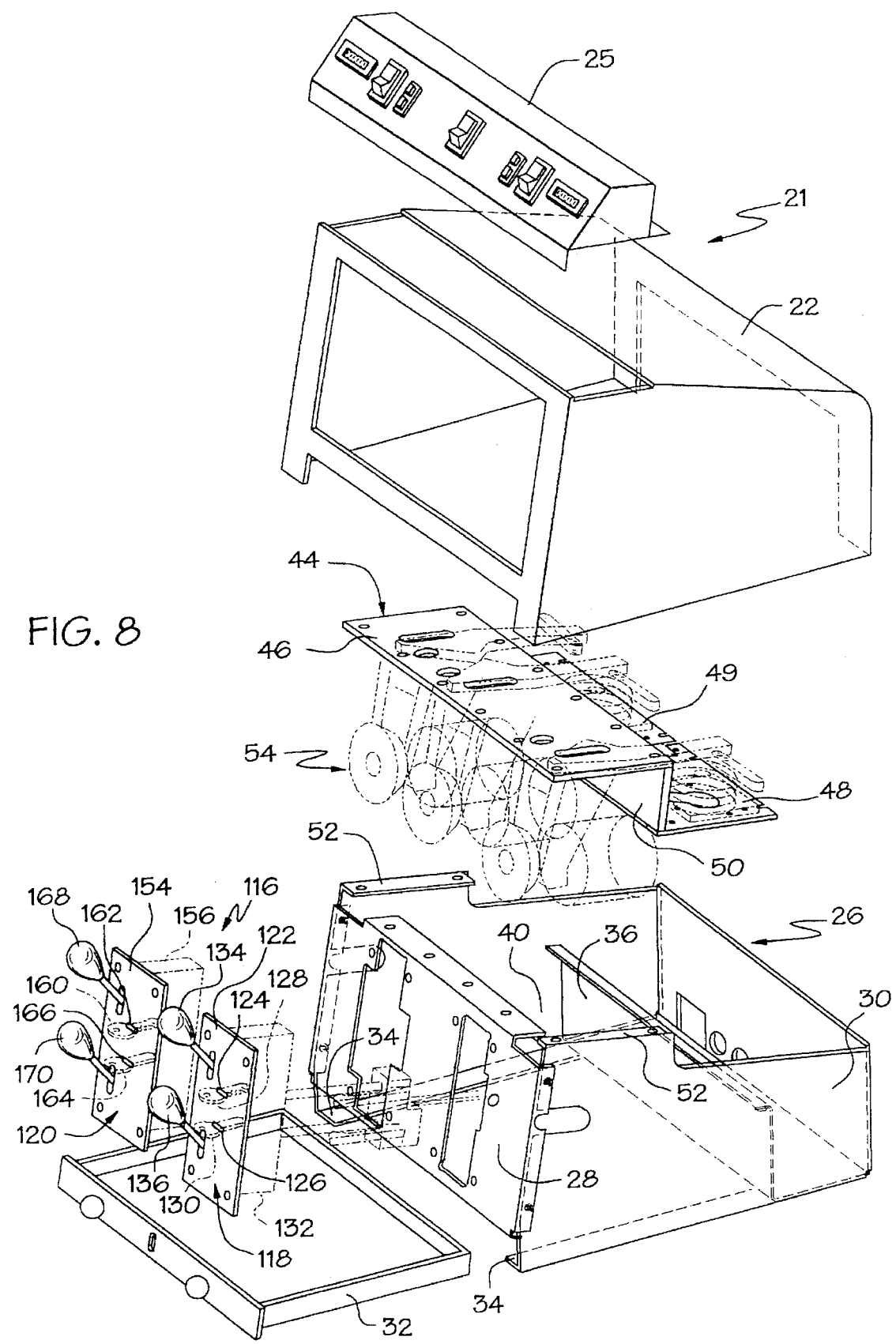
FIG. 8 is an exploded, perspective view of the machine of FIG. 1.

As shown in FIGS. 2, 3 and 8, the housing 22 includes operator control console 25 and encloses a body, generally designated 26, which includes a front wall 28, unitary side and rear walls 30, and a chip collection drawer 32. The unitary side and rear walls 30 form slides 34 which receive the drawer 32. A divider wall 36 separates the electronic components 38 (see FIG. 2) from the chip cutting area 40 within the frame 26. The front wall 28 is attached to the unitary side and rear walls 30 by screws 42. A top wall 44 includes a front portion 46, rear portions 48, 49 and midwalls 50, 51. Midwalls 50, 51 interconnect the front and rear portions 46, 48, 49 and are oriented substantially vertically. The front portion 46 is attached to the front wall 28, and to flanges 52 formed on the upper front portion of the unitary side and rear walls 30, by screws (not shown). Consequently, the front wall 28 and top wall 44 are contiguous, so that components mounted on the front wall 28 can be located with high precision relative to components mounted on the top wall 44 (see also FIG. 4).

Key Cutter Assembly

The key duplicator 20 includes a key cutter assembly, generally designated 54, as shown in FIG. 3, which includes a first cutter module 56 for cutting a single-sided key blank and a second cutter module 58 for simultaneously cutting the sides of the blade of a double-sided key. As will be explained, the key cutter assembly 54 is mounted on the top wall 44.

As shown in FIGS. 3, 4, 11 and 12, the first cutter module 56 includes a cutter motor 60 which is mounted on a motor block 62 that includes gearing (not shown) for driving a cutter wheel 64, which is mounted on an output shaft 66 of the gearing. The output shaft 68 of the motor 60 drives the gearing, rotating the output shaft 66. The motor block 62 is attached to support arms 66, 68 which, in turn, are connected by a bridge 70 that supports a vertically extending cam wheel 72. A slide rod 74 extends between support arms 66, 68. The motor block 62 also supports a follower, generally designated 76, which includes a follower bar 78, lower follower support 80, upper follower support 82, and mounting screw 84. The mounting screw 84 threads into the motor block 62 and clamps the follower bar 78 between the upper and lower supports 82, 80. An adjusting screw 86 threads into the lower support 80 and engages a slot formed on the underside of the follower bar 78. The adjusting screw 86 is threaded into or out of the lower support 80 to adjust the horizontal orientation of the follower 78 with respect to cutter wheel 64.

The motor block 62 is attached to a cutter slide assembly, generally designated 88, which includes a cutter slide block 90 that is slidably mounted on a rod 92. Rod 92 is attached to and supported at its front end at strut 94, and by its rear end by midwall 50. Strut 94 is attached to front portion 46 of top wall 44. A coiled extension spring 96 is seated within the cutter slide block 90 and engages a post 98 attached to the arm 68. Spring 96 exerts force on arm 68 to displace the motor block 62 sidewardly away from rod 92. A cam wheel 100 is mounted on and extends upwardly from the top of cutter slide block 90. A cutter link arm 102 is pivotally attached to cutter slide block 90 and extends rearwardly through a cutout 104 formed in the midwall 50.

Figure 4:
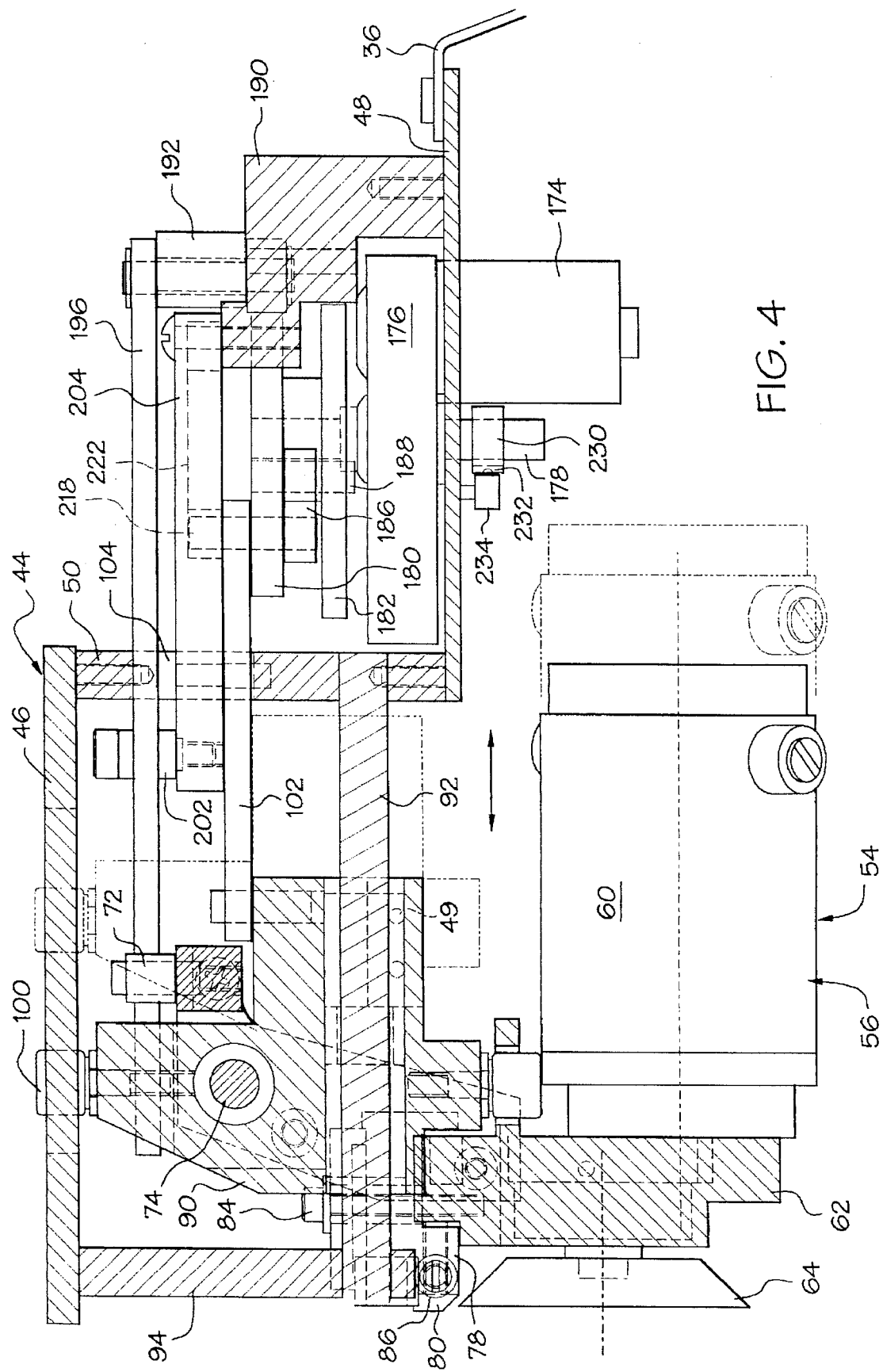
FIG. 4 is a side elevation in section taken at line 4—4 of FIG. 3.
Figure 11:
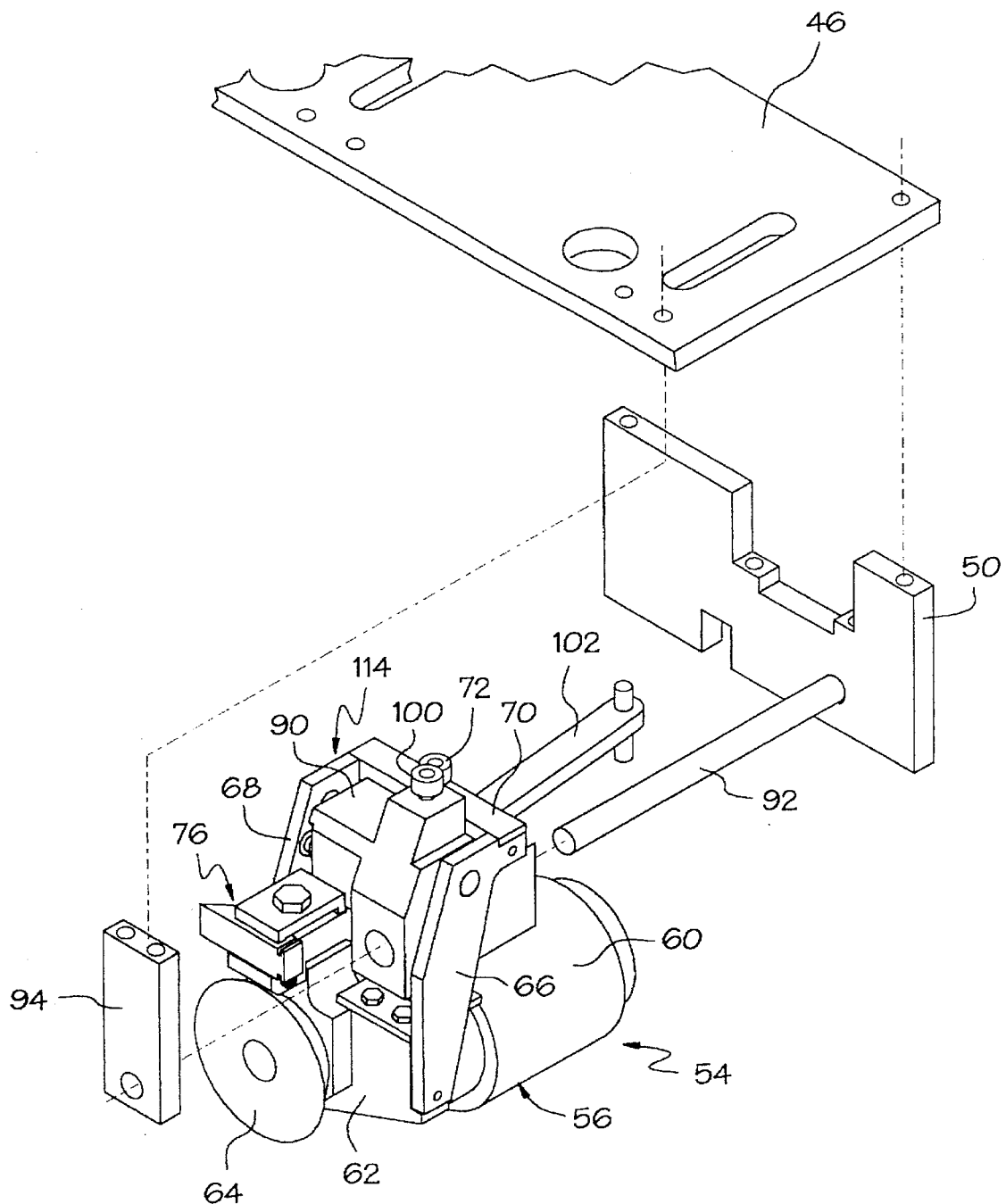
FIG. 11 is a detail perspective view of a cutter assembly for the single-sided key cutter of the key duplicating machine of FIG. 1.
Figure 12:
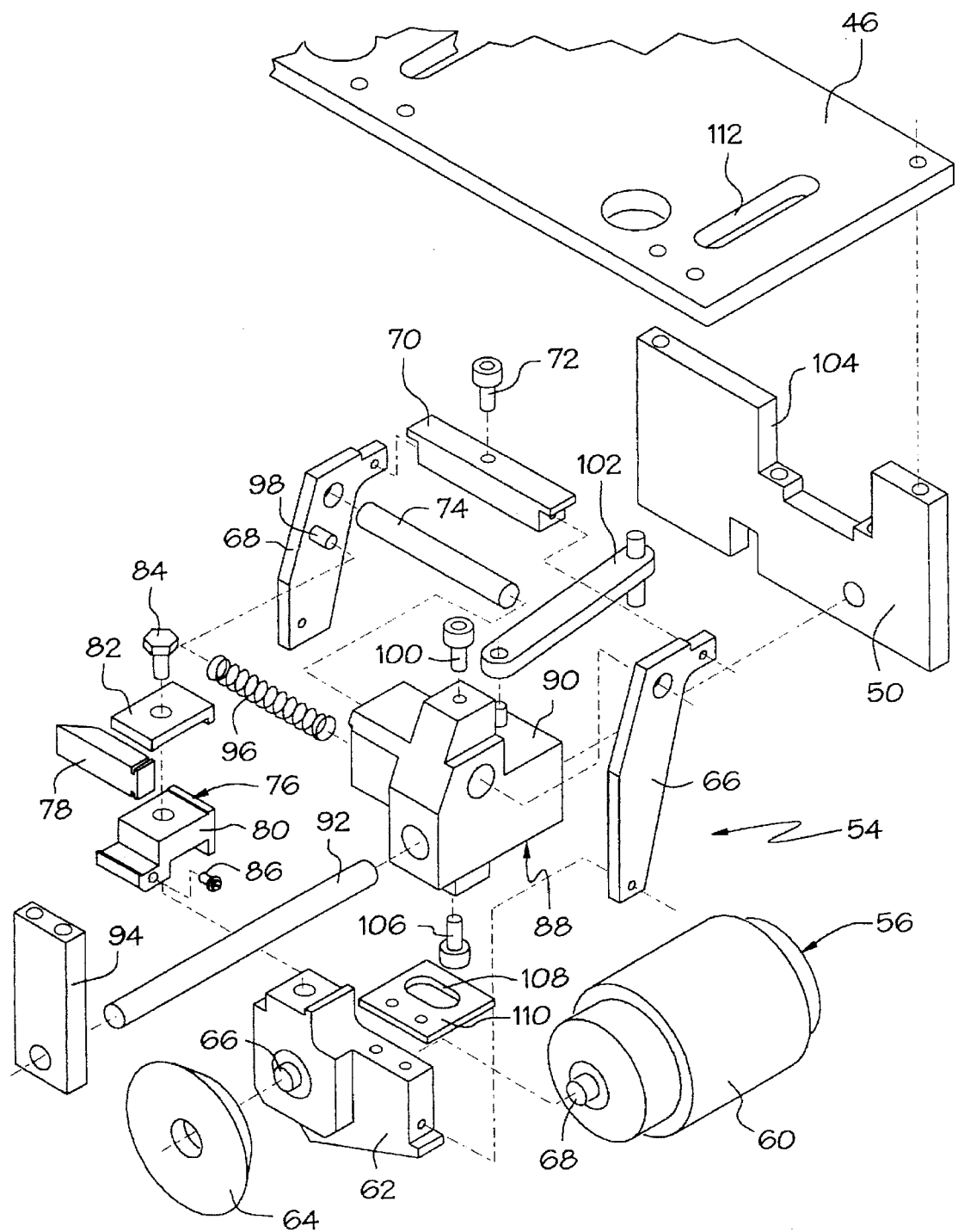
FIG. 12 is an exploded, perspective view of the detail of FIG. 11.

The foregoing structure of the first cutter module 56 is duplicated with respect to the second cutter module 58 in the form of cutter units 106, 107, it being understood that cutter unit 107 is a mirror image of the cutter module 56 disclosed and described in FIGS. 4, 11, and 12.

A cam wheel 106 is attached to and extends vertically downwardly from the cutter slide block 90 and engages a later cam slot 108 formed in a cam plate 110 which is attached to the motor block 62. Cam wheel 100 engages a cam slot 112 formed in the front portion 46 and extending in a longitudinal direction. The engagement of cam wheel 100 with cam slot 112 prevents rotation of the cutter slide block 90 about longitudinal shaft 92. Similarly, the engagement of cam wheel 106 with cam slot 108 prevents the rotation of the motor block 62 about lateral slide rod 74.

As shown in FIGS. 3 and 11, the motor 60 is mounted on a carriage 114 which is made up of support arms 66, 68, bridge 70, motor block 62, motor 60, cutter wheel 64 and follower assembly 76. This carriage 114 is spring biased sidewardly to the left of the rod 92, as shown in FIG. 3, with respect to the first cutter module 56.

Figure 6:
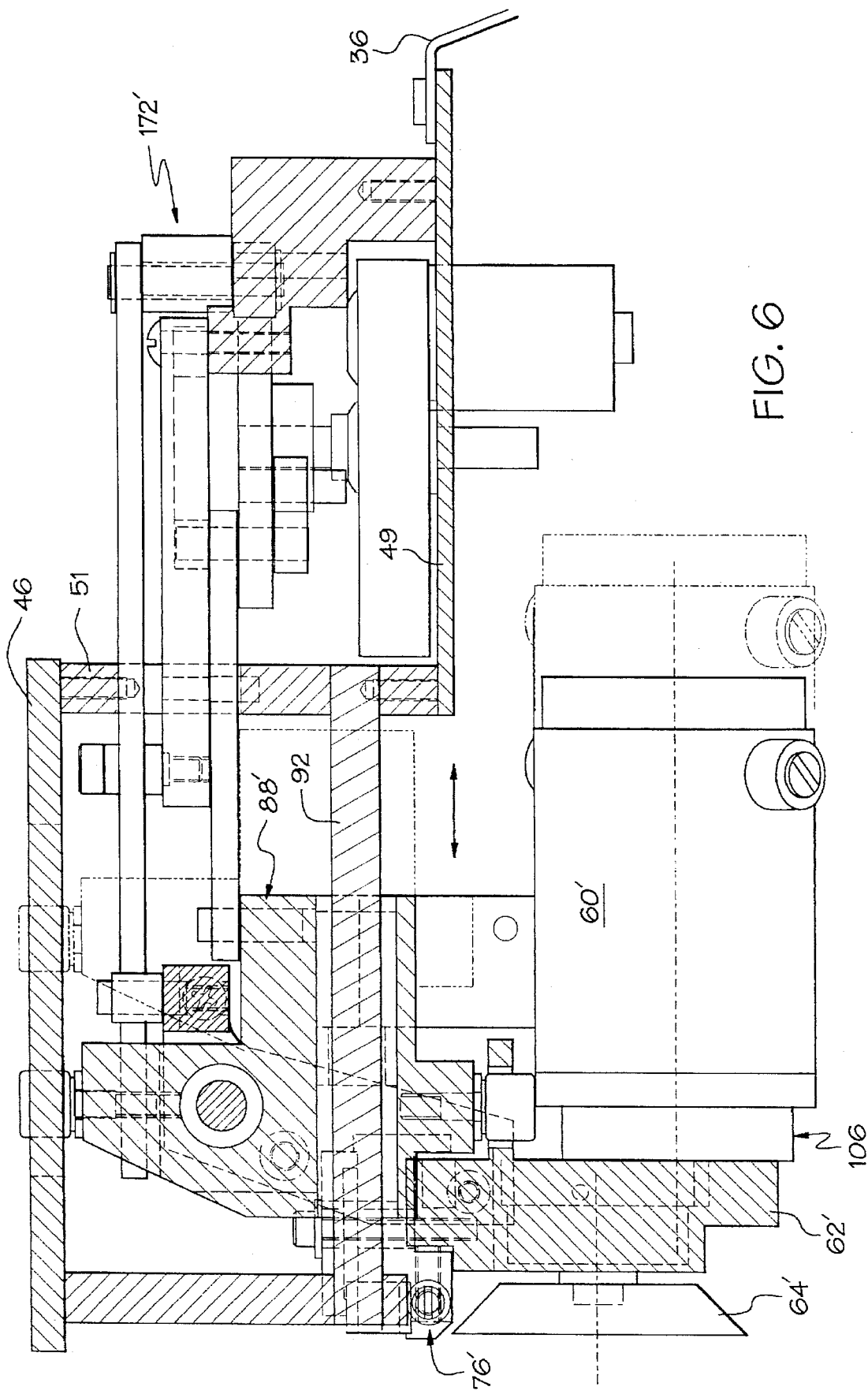
FIG. 6 is a side elevation in section taken at line 6—6 of FIG. 3.

As shown in FIG. 6, the cutter unit 106 includes a motor 60' mounted on a motor block 62' which supports a cutter wheel 64' and is attached to a cutter slide assembly 88' that slides on a rod 92'. Follower 76' is positioned above cutter wheel 64'. Accordingly, the structure of the cutter assembly 106 is virtually identical to that shown in FIG. 4 or the first cutter module 56. As stated previously, cutter unit 107 is a mirror image of cutter unit 106.

Clamping Assembly

As shown in FIGS. 1, 3 and 8, the key duplicator 20 includes a key clamping assembly 116 which includes a single-sided key clamping module 118 and a double-sided key module 120. Clamping module 118 includes a cover plate 122 which attaches to the front wall 28 and includes slots 124, 126 for receiving a single-sided customer key 128 and a corresponding single-sided key blank 130. A clamp block 132 is attached to cover plate 122 and includes a spring-loaded clamping mechanism for securing keys 128, 130 is vertical and horizontal alignment. The clamping mechanism for key 128 is actuated by upper lever 134, and the clamping mechanism for key 130 is actuated by lever 136. The structure of the clamping mechanism of the clamp block 132 is shown and described in commonly owned U.S. application Ser. No. 08/289,860, filed Aug. 12, 1994, the disclosure of which is incorporated herein by reference.

Clamp block 132 includes slide rods 138, 140 which extend rearwardly from the rear surface of the clamp block toward midwall 50. As shown best in FIGS. 3 and 5, a slide 142 is slidably mounted on rods 138, 140 and includes a pivot finger 144, which is urged to pivot in a clockwise direction, as shown in FIG. 3, by coil spring 146, against key 128. Block 142 includes a lower finger 150 (shown in FIG. 5) which is urged by coil spring 152 to pivot against key 130 (FIG. 1). Consequently, fingers 144, 150 urge keys 128, 130 against alignment shoulder 148 to maintain the keys in vertical alignment. The fingers 144, 150 pivot about pin 154, which extends vertically through the block 142. A coil spring 156 is mounted in the clamp block 132 and urges the slide block 142 rearwardly along rods 138, 140.

Double-sided key clamping module 120 includes a cover plate 154 which supports a double-sided clamp block 156 that receives double-sided customer key 160 through opening 162, and double-sided blank key 164 through opening 166. A spring-loaded clamping mechanism is enclosed and supported within clamping block 166 and lever 168 actuates the clamping mechanism for customer key 160, while lever 170 actuates the clamping mechanism for key blank 164. The structure of the clamping mechanism is shown and described in greater detail in commonly owned co-pending application Ser. No. 08/289,860, filed Aug. 12, 1994.

Cam Assembly

Figure 9:
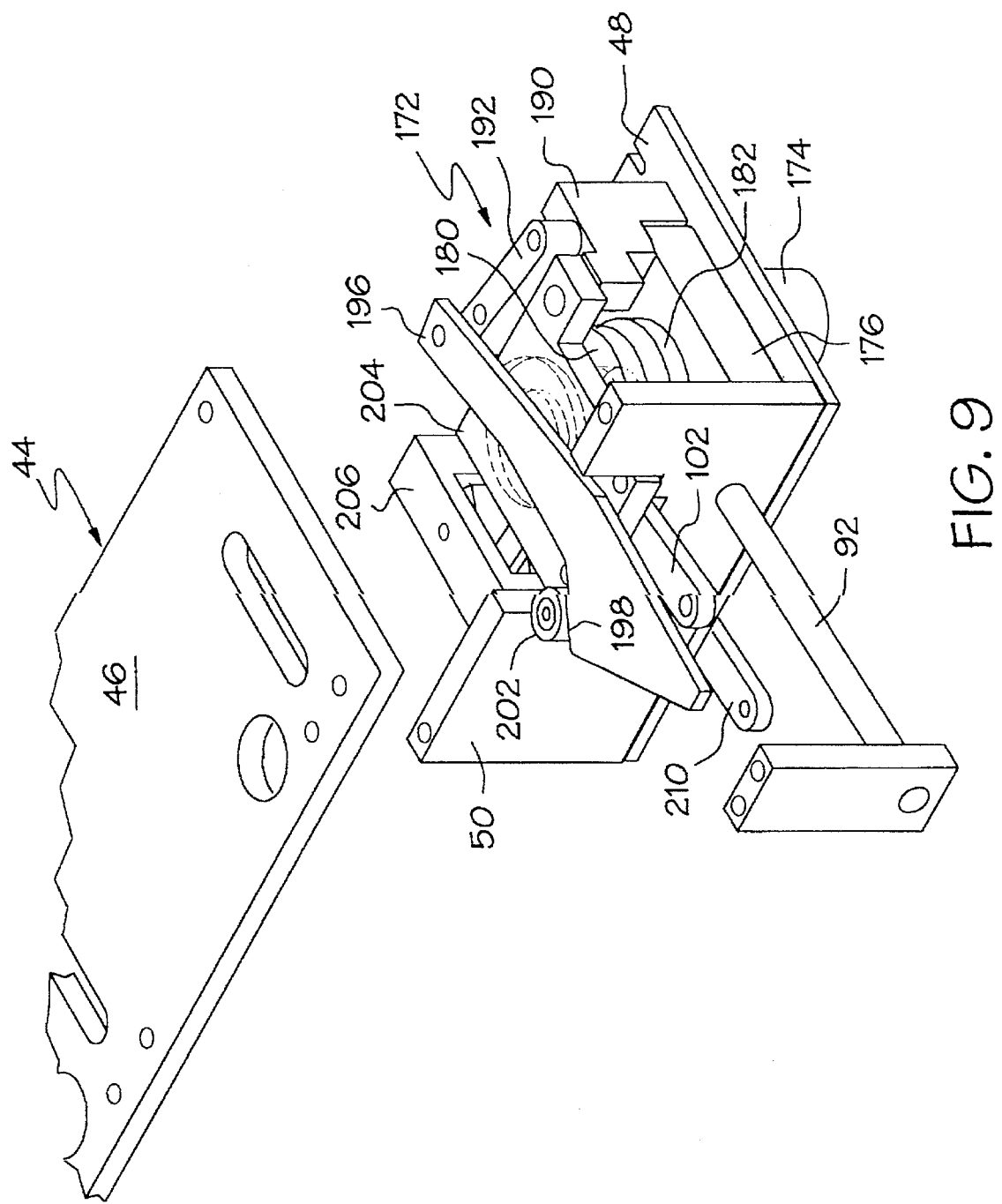
FIG. 9 is a detail perspective view of the cam assembly of the single-sided key cutter module of the key duplicating machine of FIG. 1.
Figure 10:
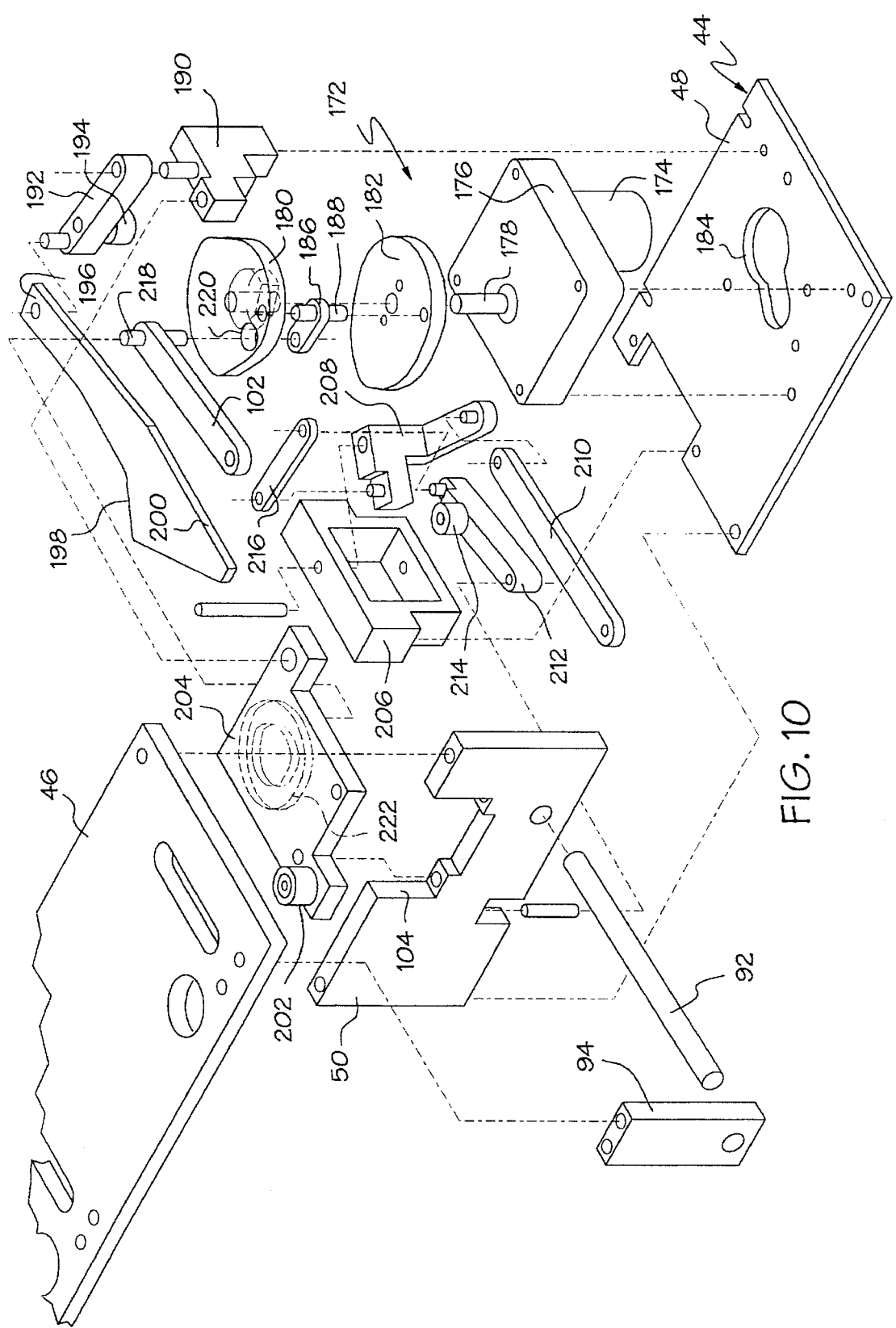
FIG. 10 is an exploded, perspective view of the detail of FIG. 9.

As shown in FIGS. 9 and 10, a cam assembly for actuating the cutter module 56 and slide 142, generally designated 172, is mounted on rear portion 48 of top wall 44. The cam assembly 172 includes a cam motor 174 which is mounted on a gearbox 176 having an output shaft 178 that supports upper and lower cams 180, 182. Gearbox 176 is mounted on rear portion 48, the latter including an opening 184 which provides clearance for the shaft 178 and motor 174 therethrough. Upper and lower cams 180, 182 are connected to each other on shaft 178, and together support a cam link 186 which extends between them and is freely pivotal about a vertical pin 188.

A support block 190 is mounted on the rear portion 48 and supports for pivotal movement a wedge link arm 192 having a cam wheel 194 which engages upper cam 180, and which, in turn, supports wedge link arm 196. As best shown in FIGS. 3 and 10, wedge link arm 196 includes a sharply angled segment 198 and a straight segment 200. Sharply angled segment 198 engages a cam wheel 202 which is mounted on a cam plate 204 that, in turn, is mounted on midwall 50 and support block. Segment 200 engages cam wheel 72 on the carriage 114 (see FIG. 11).

As shown in FIG. 10, support block 206 is mounted on rear portion 48 and pivotally supports bell crank 208 which, in turn, pivotally supports link arm 210 that is pivotally connected to slide block 142. Cam arm 212 supports cam wheel 214 which engages lower cam wheel 182. The forward end of cam arm 212 is pivotally mounted to midwall 50, and the rearward end is pivotally attached to link arm 216 which, in turn, is pivotally attached to bell crank 208 at an end opposite that of the bell crank attached to link 210.

As shown in FIGS. 4, 9 and 10, link arm 102 includes a pin 218 which pivotally engages cam link 186 and at a lower end, and extends upwardly through enlarged opening 220 in cam 180 to engage a cam track 222 formed in the underside of plate 204. Thus, as cam link 186 is rotated by motor 174, the distance of pin 218 from the axis of rotation, defined by output shaft 178, varies according to an eccentric path defined by cam track 222.

As shown in FIG. 3, cam assembly 172' is mounted on rear portion 49 and is of identical construction to cam assembly 172, with respect to cam 180' and its engagement with wedge link arm 196'. Wedge link arm 196" is also driven by cam assembly 172' and is pivotally connected to link arm 274 which, in turn, is pivotally connected at one end to link arm 192' and at its opposite end to support block 226, which in turn is mounted on rear portion 49. Consequently, wedge link arm 196" is actuated by cam assembly 172' in a manner which will be described with respect to cam assembly 172 and wedge link 196.

System Operation

As shown in FIGS. 13–20, with respect to the cam assembly 172 and cutter assembly 56 of the single-sided key duplicating component of the duplicating machine, the cam assembly actuates both the cutter assembly and the slide block 142. Initially, customer key 128 and the appropriate, corresponding blank key 130 are inserted through slots 124, 126 and the front plate 122 so that the key blades engage the clamping component 132 (see FIG. 8). Levers 134, 136 are pivoted downwardly to release clamping the clamping mechanism to engage keys 128, 130, which are held against shoulders 148 by spring loaded finger 144. The shoulder of the key rests against the cover plate 122. When the motor 174 is activated, it rotates cams 180, 182.

Figure 5:
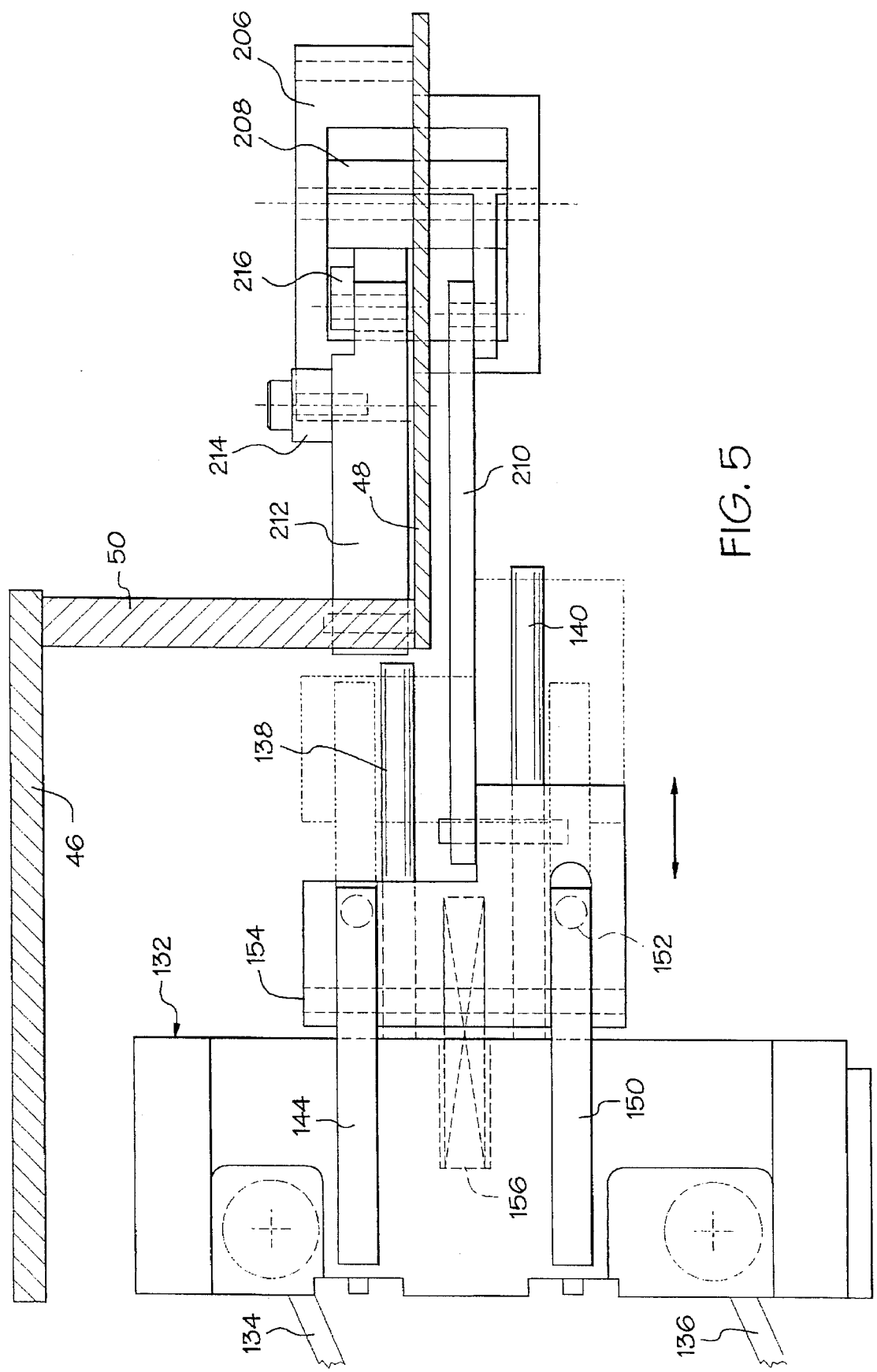
FIG. 5 is a side elevation in section taken at line 5—5 of FIG. 3.
Figure 7:
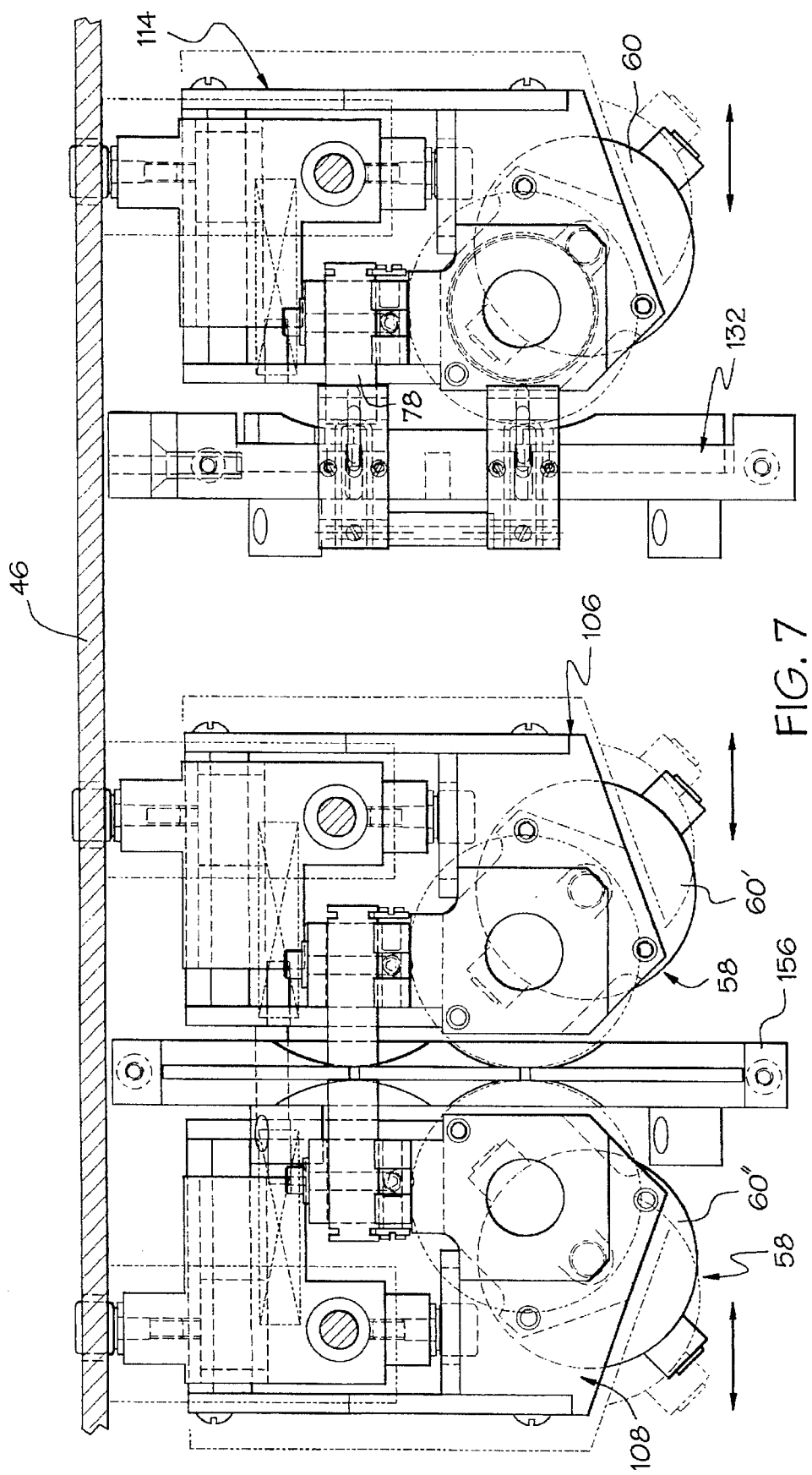
FIG. 7 is front elevation partially in section taken at line 7—7 of FIG. 3.

Initially, cam 182 engages cam wheel 214, and with further counterclockwise rotation, causes the bell crank 208 to begin to pivot in a clockwise direction, which causes slide block 142 to travel rearwardly on rods 138, 140 (FIG. 5). As shown in FIGS. 13–14, this causes the finger 144 to withdraw from its engagement with key 128, thereby providing clearance for the follower 78 to engage the customer key 128 and cutter wheel 64 to engage the key blank 130 (see FIG. 7). At this same time, rotation of cam wheel 180 allows wedge link arm 196 to move forwardly slightly, which results in the angled surface 198 of the wedge link arm moving forwardly relative to cam wheel 202, which in turn allows the carriage 114 to move to the left in FIG. 14 towards the key clamping mechanism 132. In addition, rotation of the cams 180, 182 causes cam link 186 to rotate counterclockwise, urging link arm 210 forwardly slightly, which in turn urges cutter block 90 forwardly along rail 92, resulting in carriage 114 moving forward so that follower 78 and cutter wheel 64 are in a forward-most position relative to keys 128, 130.

As shown in FIGS. 15 and 16, continued rotation of the cams 180, 182 causes the slide block 142 to continue its rearward path of movement, while the wedge link arm 196 is urged forwardly to allow the carriage 114 to fully engage the keys 128, 130 with follower 78, and cutter wheel 64, respectively. Further, rotation of the cam link 186 causes the cutter block 90 to be drawn rearwardly along rail 92, which results in the cutter wheel 64 and follower 78 to engage the keys 130, 128, respectively. At this time, the cutter assembly begins a cutting pass with respect to the key blank 130, wherein the carriage 114 urges the follower 78 and cutter wheel 64 to trace the cut pattern on the blade of the customer key 128 and, simultaneously, cut an identical pattern on the blank key 130.

Figure 17:
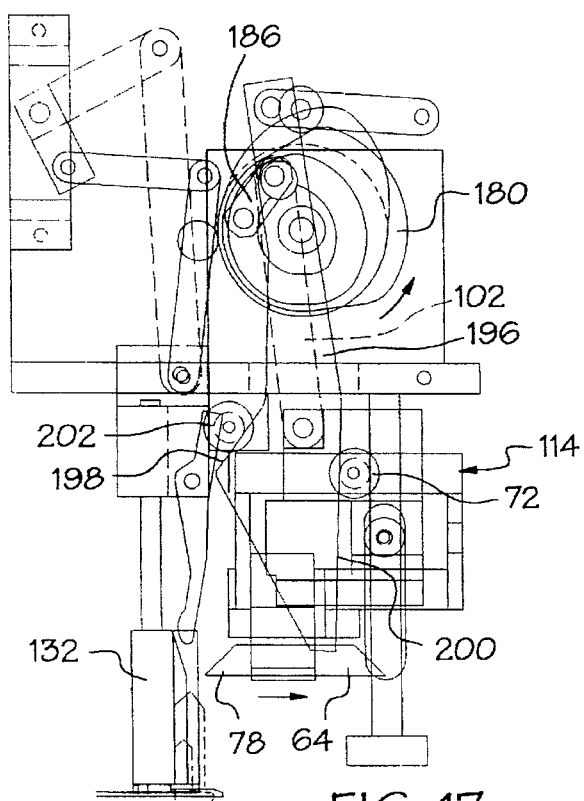
Figure 18:
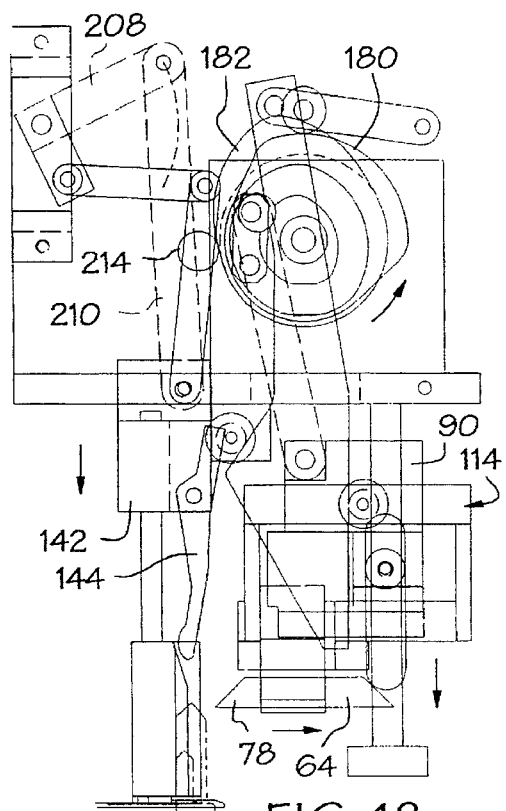
Figure 20:
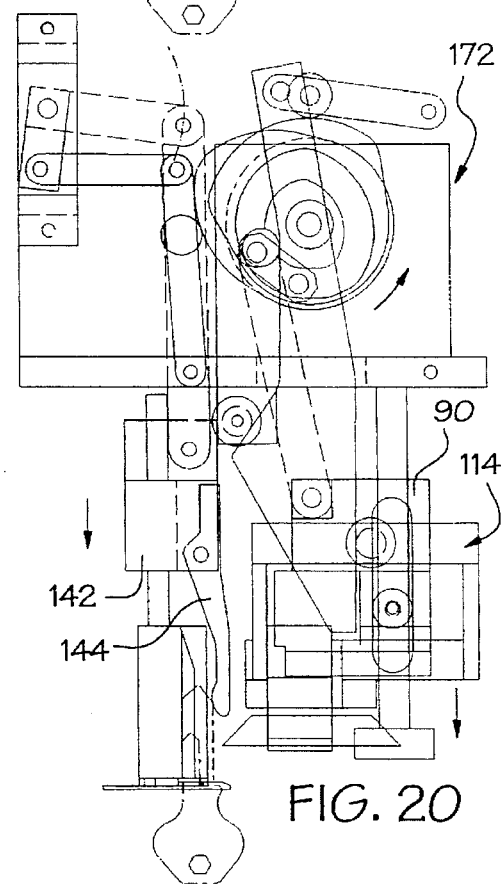

As shown in FIGS. 17 and 18, continued rotation of the cam 180 causes the wedge link arm 196 to be drawn rearwardly, which causes the angled edge 198 to move relative to cam wheel 202. This forces the carriage 114 sidewardly away from the cutter block 132, as a result of engagement of cam wheel 72 with edge 200, so that the follower 78 and cutter wheel 64 disengage the respective customer key 128 and duplicate key 130, which has now been fully cut. As shown in FIG. 20, the cutter block 90 and carriage 114, now spaced from the finished keys 128, 130, are urged forwardly by the link arm 102, which is urged forwardly by cam link 186. Similarly, link arm 210 is urged forwardly by bell crank 208, which in turn is pivoted by engagement of cam wheel 214 with cam 182, whereby slide block 142 begins to move forwardly to bring finger 144 into engagement with the keys 128, 130. The slide block 90 and carriage 114 begin a return pass, at which time there is no engagement between the follower 78 and cutter wheel 64, and the finished keys 128, 130.

Figure 19:
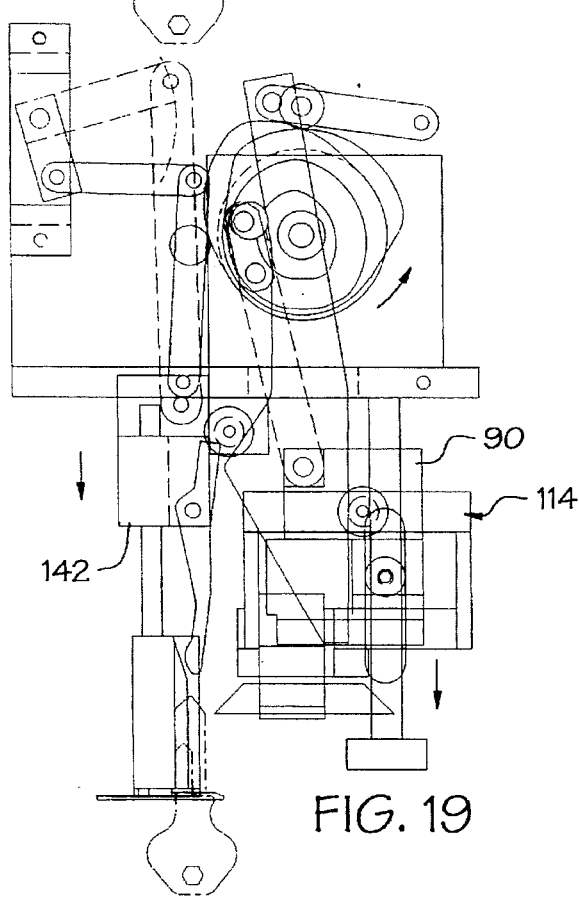

As shown in FIGS. 19 and 20, the return pass of the cutter block 90 and carriage 114 is completed by continued rotation of the cam assembly 172 in the manner previously described with respect to FIGS. 19 and 20. Slide block 142 continues its forward path of movement until the finger 144 once again engages the blade of the keys 128, 130. The cycle is completed with the cutter assembly 56 and slide block 142 shown at the starting positions at FIG. 15.

As shown in FIG. 4, the gear box output box 178 includes a plastic sleeve 230 having a recess 232 formed in its periphery. A switch 234 is mounted beneath the rear portion 48 and engages the sleeve 230. The switch 234 sends a signal which stops the motor 174 and cutter motor 60 once the sleeve 230, and shaft 178 have made a full rotation. Consequently, the entire cutting operation is effected in a single, 360° rotation of the cams 180, 182.

With respect to the double-sided key duplication operation, the process is virtually identical, except that cutter units 106, 108 are displaced simultaneously during the rotation of the cam assembly 172'. Cutter units 106, 108 are joined by a bridge 236 so that they move in unison when urged forwardly and rearwardly by link arm 102'.

The operation of the double-sided key clamping assembly 120 and cutter assembly 58 is as follows: As shown in FIG. 8, customer key 160 and blank key 164 are inserted in slots 162, 166, and centered within the clamping mechanism 156. Levers 168, 170 are pivoted downwardly, allowing the clamping mechanism 156. Levers 168, 170 are pivoted downwardly, allowing the clamping mechanisms to secure the keys 160, 164 in position. Cam motor 174 of cam assembly 172' is activated, as are cutter motors 60', 60" of the cutter modules 106, 108. Rotation of the cam 180' and cam link 186 in the manner previously described with respect to cam assembly 172 causes the cutter assemblies 106, 108 to move in a cutting pass, then subsequently in a return pass, the latter pass occurring while the carriages 114', 114" are displaced sidewardly, away from the clamp block 156, as with the cutter assembly 56. Wedge link arms 196', 196" move in unison as a result of the actuation of link arm 192' and link arm 224. At the end of the cutting operation, clamp levers 168, 170 are pivoted upwardly to release the customer key 60 and the now-finished duplication key 164.

After cutting operations for both the single-sided cutter module 56 and double-sided cutter modules 58, all of the chips formed during the cutting operation fall freely and unimpeded to the chip drawer 32. As shown best in FIG. 7, the components beneath the cutter wheels 64 are minimized so that there are a minimal number of surfaces which could possibly collect chips. Further, the midwalls 50, 51 and rear portions 48, 49 act as barriers which prevent chips formed during the cutting operations from progressing to the cam assemblies 172, 172' and fouling or otherwise collecting on the rear portions 48, 49 and cam assembly elements. Consequently, the key duplicator 20 of the present invention does not require maintenance and cleaning as often as prior art key duplicating machines, the likelihood of breakdowns due to clogging and jamming is minimized and the quality of keys duplicated is optimized.

While the form of apparatus herein described constitutes a preferred embodiment of the invention, it is understood that other forms of apparatus may be employed without departing from the scope of the invention.

What is claimed is:

1. A key duplicating machine comprising:

a key clamping assembly for supporting a key blank and a customer key to be duplicated;

a key cutter assembly having a cutter wheel for cutting a pattern on said supported key blank and a follower for tracing a tooth pattern on said supported customer key;

a housing having a front wall, a top wall and a chip collection drawer located below said front and top walls;

said key clamping assembly being mounted on said front wall and said key cutter assembly being mounted on said top wall such that no obstructions exist between said key cutter assembly and said chip collection drawer so that chips formed from a key cutting operation by said key cutter assembly fall unimpeded to said chip collection drawer and surfaces which may collect said chips are minimized.

2. The key duplicating machine of claim 1 wherein said key cutter assembly is positioned laterally adjacent to said key clamping assembly.

3. The key duplicating machine of claim 1 wherein said front wall is contiguous to said top wall such that said key clamping assembly is located relative to said key cutter assembly with precision, whereby accuracy of said key cutting operation is maintained.

4. The key duplicating machine of claim 3 wherein said key clamping assembly includes a first clamping module for supporting a single-sided key blank and single-sided customer key; and a second clamping module for supporting a double-sided key blank and double-sided customer key.

5. The key duplicating machine of claim 4 wherein said key cutter assembly includes a first cutter module for cutting a single-sided key blank; and a second cutter module for cutting a double-sided key blank.

6. The key duplicating machine of claim 5 wherein said second cutter module includes first and second cutter units for simultaneously cutting a double-sided key blank.

7. The key duplicating machine of claim 6 wherein said first clamping module includes an alignment edge for holding said customer key and said blank key in lateral alignment relative to each other; and a resilient finger assembly for urging said keys against said alignment shoulder.

8. The key duplicating machine of claim 7 wherein said resilient finger assembly includes a pair of resilient fingers for urging against said keys to urge said keys against said alignment edge; and a slide assembly for supporting said fingers and moving said fingers forwardly into a position for engagement with said keys and rearwardly into a position of nonengagement with said keys.

9. The key duplicating machine of claim 8 wherein said slide assembly includes a slide rod mounted on and cantilevered rearwardly from said first clamping module.

10. The key duplicating machine of claim 9 wherein said first and second cutter modules are mounted on first and second slide assemblies, respectively, said slide assemblies being mounted on said top wall.

11. The key duplicating machine of claim 10 wherein said top wall includes a front portion, a rear portion and a midwall extending substantially vertically between said front and rear portions.

12. The key duplicating machine of claim 11 wherein said first cutter module includes a motorized cutter wheel and follower for engaging said single-sided key blank and said single-sided customer key, respectively, a cutter carriage assembly supporting said motorized cutter wheel and follower for lateral movement relative to said single-sided keys, and a cutter slide assembly supporting said cutter carriage assembly for longitudinal movement relative to said keys.

13. The key duplicating machine of claim 12 wherein said cutter slide assembly includes a rail attached to and extending between said front portion and said midwall.

14. The key duplicating machine of claim 13 wherein said cutter slide assembly includes a slide cam engaging said housing to prevent rotation of said cutter slide assembly about said rail.

15. The key duplicating machine of claim 14 wherein said cutter carriage assembly includes a lateral side mounted on said cutter slide assembly.

16. The key duplicating machine of claim 15 wherein said cutter carriage assembly includes a carriage cam engaging said cutter slide assembly to prevent rotation of said cutter carriage assembly about said lateral slide.

17. The key duplicating machine of claim 11 wherein said first and second cutter units each include a motorized cutter wheel and follower for engaging said double-sided key blank and said double-sided customer key, respectively, a cutter carriage assembly supporting said motorized cutter wheel and follower for lateral movement relative to said double-sided keys, and a cutter slide assembly supporting said cutter carriage assembly for longitudinal movement relative to said keys.

18. The key duplicating machine of claim 17 wherein said cutter slide assembly includes a rail attached to and extending between said front portion and said midwall.

19. The key duplicating machine of claim 17 wherein said cutter slide assembly includes a slide cam engaging said housing to prevent rotation of said cutter slide assembly about said rail.

20. The key duplicating machine of claim 19 wherein said cutter carriage assembly includes a lateral side mounted on said cutter slide assembly.

21. The key duplicating machine of claim 20 wherein said cutter carriage assembly includes a carriage cam engaging said cutter slide assembly to prevent rotation of said cutter carriage assembly about said lateral slide.

22. The key duplicating machine of claim 21 further comprising a motor mounted on said rear portion, a cam wheel assembly mounted on and driven by said motor, a first link assembly, engaging said cam wheel assembly and connected to said slide assembly for reciprocating said slide assembly to move said finger to a rearward position during a cutting pass by said cutter carriage assembly.

23. The key duplicating machine of claim 22 further comprising a second link assembly, engaging said cam wheel assembly and connected to said cutter carriage assembly for reciprocating said cutter carriage assembly to move said cutter unit in a cutting pass and a return pass relative to said keys.

24. The key duplicating machine of claim 23 further comprising a wedge arm assembly positioned to engage said cam wheel assembly, for displacing said cutter carriage assembly sidewardly away from said keys during said return pass.

25. The key duplicating machine of claim 24 wherein said wedge arm assembly includes a wedge arm, a first wedge arm cam mounted on said midwall and engaging said wedge arm, a second wedge arm cam mounted on said cutter carriage assembly and engaging said wedge arm on a side opposite said first wedge arm cam, and a wedge link arm having a wedge cam follower engaging said cam wheel assembly.

26. The key duplicating machine of claim 25 wherein said wedge link arm is connected to said wedge arm and said rear portion.

27. The key duplicating machine of claim 26 wherein said cam wheel assembly includes a first cam element engaging said first link assembly; a second cam element engaging said wedge link arm; and a drive link, attached to said cam wheel assembly off center from an axis of rotation thereof, connected to said second link assembly.

28. The key duplicating machine of claim 27 wherein said cam wheel assembly includes a cam plate, positioned above said first and second cam elements, having an eccentric cam slot formed therein, and said drive link includes a pin positioned within said cam slot such that, during rotation of said cam link by said motor, a distance to said axis of rotation is varied so that the velocity of said cutter carriage assembly during said cutting pass is substantially constant.

29. The key duplicating machine of claim 16 further comprising a motor mounted on said rear portion, a cam wheel assembly mounted on and driven by said motor, a first link assembly, engaging said cam wheel assembly and connected to said slide assembly for reciprocating said slide assembly to move said finger to a rearward position during a cutting pass by said cutter carriage assembly.

30. The key duplicating machine of claim 29 further comprising a second link assembly, engaging said cam wheel assembly and connected to said cutter carriage assembly for reciprocating said cutter carriage assembly to move said cutter unit in a cutting pass and a return pass relative to said keys.

31. The key duplicating machine of claim 30 further comprising a wedge arm assembly positioned to engage said cam wheel assembly, for displacing said cutter carriage assembly sidewardly away from said keys during said return pass.

32. The key duplicating machine of claim 31 wherein said wedge arm assembly includes a wedge arm, a first wedge arm cam mounted on said midwall and engaging said wedge arm, a second wedge arm cam mounted on said cutter carriage assembly and engaging said wedge arm on a side opposite said first wedge arm cam, and a wedge link arm having a wedge cam follower engaging said cam wheel assembly.

33. The key duplicating machine of claim 32 wherein said wedge link arm is connected to said wedge arm and said rear portion.

34. The key duplicating machine of claim 33 wherein said cam wheel assembly includes a first cam element engaging said first link assembly; a second cam element engaging said wedge link arm; and a drive link, attached to said cam wheel assembly off center from an axis of rotation thereof, connected to said second link assembly.

35. The key duplicating machine of claim 34 wherein said cam wheel assembly includes a cam plate, positioned above said first and second cam elements, having an eccentric cam slot formed therein, and said drive link includes a pin positioned within said cam slot such that, during rotation of said cam link by said motor, a distance to said axis of rotation is varied so that the velocity of said cutter carriage assembly during said cutting pass is substantially constant.

36. The key duplicating machine of claim 29 wherein said rear portion is at a lower elevation than said front portion such that said midwall acts as a barrier to prevent said chips from passing to said cam wheel assembly.

37. A key duplicating machine comprising:

a key clamping assembly for supporting a key blank and a customer key to be duplicated;

a key cutter assembly having a cutter wheel for cutting a pattern on said supported key blank and a follower for tracing a tooth pattern on said supported customer key;

a motor driven device for actuating said clamping assembly and said cutter assembly; and a housing including a top wall having a midwall and a rear portion for supporting motor driven device, said midwall and rear portion separating said motor driven device from said key cutter assembly and shielding said motor driven device from chips formed by said key cutter assembly such that said chips are prevented from collecting on said motor driven device.

38. A key duplicating machine comprising:

a housing;

a top wall shaped to support a key cutter assembly and having a midwall and rear portion for supporting a cam assembly for actuating said key cutter assembly; and side walls connected to said top wall, said top wall and said side walls defining a cutting volume, said midwall and said rear portion being shaped such that said supported cam assembly is separated from said cutting volume so that chips formed from a cutting operation conducted within said volume do not collect on said cam assembly.

39. A key duplicating machine comprising:

a housing;

opposing side walls;

a rear wall including a panel positioned forwardly thereof;

a front wall;

a top wall having a front portion, a rear portion and a midwall connecting said front and rear portions;

said front wall, side walls, panel, midwall and front portion forming a first volume for a key cutting operation performed by key cutting means forwardly in said housing, and said midwall, rear portion side walls form a second volume for enclosing a cam assembly for actuating said key cutting means, said second volume being separated from said first volume such that chips formed by said cutting means are prevented from entering said second volume and collecting on said cam assembly.

40. The key duplicating machine of claim 39 wherein said panel, side walls, rear wall and rear portion define a third volume, separate from said first volume, for enclosing electrical components for said machine such that chips formed by said cutting means are prevented from entering said second volume and collecting on said cam assembly.

41. The key duplicating machine of claim 40 further comprising a chip collection drawer slidably engaging a lower portion of said side walls.

* * * * *